United States Patent
Hoefft et al.

(10) Patent No.: US 6,937,395 B2
(45) Date of Patent: Aug. 30, 2005

(54) PANORAMIC VIEWING DEVICE

(75) Inventors: Jens-Rainer Hoefft, Aalen (DE);
Gunther Kuerbitz, Koenigsbronn (DE); Dieter Marx, Aalen (DE)

(73) Assignee: Zeiss Optronik GmbH, Oberkochen (DE)

(*) Notice: Subject to any disclaimer, the term of this patent is extended or adjusted under 35 U.S.C. 154(b) by 95 days.

(21) Appl. No.: 10/452,114

(22) Filed: Jun. 2, 2003

(65) Prior Publication Data
US 2003/0231392 A1 Dec. 18, 2003

(30) Foreign Application Priority Data

Jun. 14, 2002 (DE) .......................................... 102 26 545

(51) Int. Cl.[7] .......................... G02B 27/64; G02B 13/06
(52) U.S. Cl. ...................... 359/557; 359/554; 359/725
(58) Field of Search ................................. 359/399–410, 359/554–557, 725–732, 236, 363, 637; 396/52–55

(56) References Cited

U.S. PATENT DOCUMENTS

| | | | | |
|---|---|---|---|---|
| 3,964,817 A | * | 6/1976 | Humphrey | 359/555 |
| 4,013,339 A | * | 3/1977 | Ando et al. | 359/556 |
| 4,210,385 A | * | 7/1980 | Baudot | 359/555 |
| 4,928,174 A | * | 5/1990 | Smith | 348/143 |
| 4,980,565 A | | 12/1990 | Jehle | 250/334 |
| 5,172,268 A | * | 12/1992 | Kikuchi | 359/557 |
| 5,315,435 A | * | 5/1994 | Horiuchi | 359/554 |
| 5,338,933 A | | 8/1994 | Reeves et al. | 250/334 |
| 5,663,825 A | | 9/1997 | Amon et al. | 359/201 |
| 5,781,340 A | | 7/1998 | Suzuki | 359/554 |
| 6,108,133 A | * | 8/2000 | Joffre et al. | 359/556 |
| 6,246,520 B1 | * | 6/2001 | Iizuka | 359/557 |

* cited by examiner

Primary Examiner—Thong Q Nguyen
(74) Attorney, Agent, or Firm—Welsh & Katz, Ltd.

(57) ABSTRACT

A panoramic viewing apparatus has an imaging system that is arranged in a housing provided with a rotary drive. The imaging system has a lens system by means of which the images of the objects are imaged on a detector after passing through the lens system. There is provided in the beam path for the purpose of compensating the image motion caused by the rotation a counter-motion device that produces during the imaging time a motion directed at least approximately synchronously against the rotation produced by the rotary drive. The counter-motion device is arranged in a convergent beam path of the lens system.

5 Claims, 1 Drawing Sheet

PANORAMIC VIEWING DEVICE

BACKGROUND OF THE INVENTION

1. Field of the Invention

The invention relates to a panoramic viewing apparatus having an imaging system that is arranged in a housing provided with a rotary drive, the imaging system having a lens system by means of which the images of the objects are imaged on a detector after passing through the lens system, and there being provided in the beam path for the purpose of compensating the image motion caused by the rotation a counter-motion device that produces during the imaging time a motion directed at least approximately synchronously against the rotations produced by the rotary drive.

2. Description of the Related Art

Panoramic viewing apparatuses that can observe the entire angular range of 360 degrees are much used for the purposes of control, monitoring or observation, for example on boat masts. However, blurred images are produced because the section of the visual field varies during the recording time or exposure owing to the rapid rotation of the apparatus.

In order to avoid this image motion, the rotary movement has so far been abruptly stopped at the moment of recording in the case of conventional panoramic viewing units. The sensor head or the entire panoramic viewing unit remains stationary during exposure and then rotates further jerkily until the next recording is made.

However, this conventional method of timing is problematic as regards the technical realization, because a large mass, specifically as a rule the complete panoramic viewing apparatus, must be quickly accelerated and abruptly braked again. This method has proved to be very expensive and subject to faults.

As an alternative, therefore, there are also known panoramic viewing apparatuses in the case of which the rotary movement of the apparatus or of the housing is constant. Provided in the interior of the housing is a counter-motion device by means of which the image motion caused by the rotation is compensated at the moment of recording. A so-called descanning mechanism is talked of here. The known descanning devices are arranged in the afocal or parallel beam path.

Several variants of descanning mechanisms that are arranged in the afocal or parallel beam path are described in this context in U.S. Pat. No. 5,663,825. A mirror is used that is moved against the rotary movement of the panoramic viewing unit during the imaging time.

U.S. Pat. No. 5,338,933 discloses a descanning device in the case of which there is provided for descanning a mirror that rotates during the exposure in a direction opposite to the viewing head, and jumps back quickly into its initial position after the recording of an image, in order to repeat the operation during the exposure for the next image. The mirror is likewise arranged in the afocal or parallel beam path.

However, arranging the known descanning device in the afocal or parallel beam path necessitates a relatively large mirror, because the width of the parallel beam path requires a corresponding size. Because of the large masses resulting therefrom that are to be accelerated, these counter-motion devices are likewise very complicated to produce and relatively susceptible to disturbance in operation. Moreover, there is a spacing between the parallel beam path and the detector, because there is a need here firstly also to provide at least one additional lens in order to image these objects on the detector.

SUMMARY OF THE INVENTION

It is therefore the object of the present invention to create a panoramic viewing apparatus in the case of which an image motion is prevented by relatively simple means without interrupting the continuous rotary movement of the panoramic viewing apparatus.

This object is achieved according to the invention by virtue of the fact that the counter-motion device is arranged in a convergent beam path.

The convergent beam path, which is located directly up-stream of the detector, can be used for this purpose in a very advantageous way.

The solution according to the invention prevents an image motion without interrupting the rotary movement of the panoramic viewing apparatus. Consequently, there is no need for the entire apparatus or the entire housing to be stopped abruptly for each exposure and be re-accelerated with a large drive output.

At the same time, the disadvantages that accompany the arrangement of a counter-motion device in the afocal or parallel beam path are excluded. The arrangement of the counter-motion device in the convergent beam path means that the counter-motion device is very close to the detector without one or more further lenses or a further beam path being situated therebetween. A relatively small counter-motion device can be arranged owing to the slight spacing of the counter-motion device from the detector and the focusing beam path, which narrows down. Only small masses need be accelerated, as a result. At the same time, the counter-motion device requires a lower drive output.

The counter-motion device advantageously has a pivot axis that is parallel to the rotation axis of the rotary drive.

This produces a simple, synchronous counter-motion. Consequently, during the exposure time the scene to be imaged or the beam remain stationary on the sensor, although the panoramic viewing apparatus simultaneously continues to rotate.

In a particularly advantageous refinement, the counter-motion device has a transmitting plate, the transmitting plate possibly being designed as a plane-parallel plate.

Whereas a mirror or a wedge must be used in the case of an arrangement of the counter-motion device in the afocal or parallel beam path, in the case of an arrangement of the counter-motion device in the convergent beam path use can be made of a plane-parallel plate which is easier and more advantageous to produce and places less of a demand on the drive output.

Although astigmatism can occur through the arrangement of the plane-parallel plate, it has been established that this can be taken into account in the optical calculation and appropriately balanced out.

An exemplary embodiment is described below in principle in more detail with the aid of the drawings.

DETAILED DESCRIPTION

Figure 1:
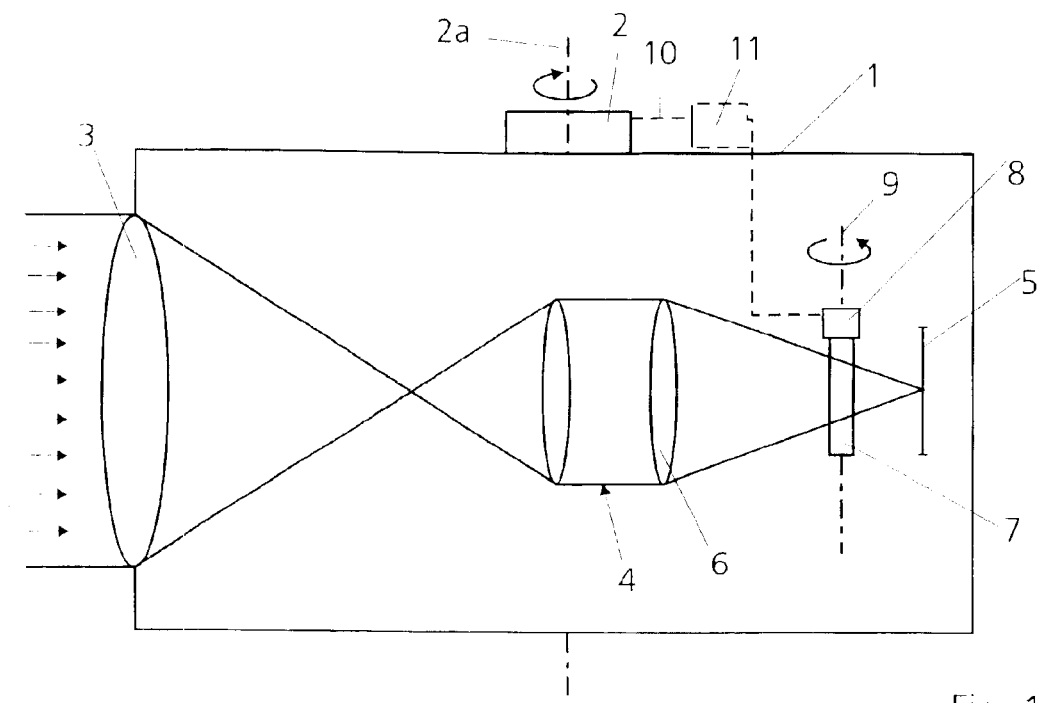
FIG. 1 shows an illustration of the principle of the design of a panoramic viewing apparatus according to the invention.

FIG. 1 shows a panoramic viewing apparatus. A rotary drive 2, not shown in more detail, is arranged on a housing 1, the panoramic viewing apparatus has a lens system with an objective 3 and an ocular 4, the image of an object (or the radiation) is imaged on a detector 5 after passing through the lens system. In order to compensate the image motion caused by the rotation of the rotary drive 2, a counter-motion device 8 with a pivoting device (not shown in more detail) is provided in the convergent beam path upstream of the detector 5, which is produced by a last lens 6, the counter-motion device 8 has a transmitting plate, the transmitting plate being designed as a plane-parallel plate 7.

The counter-motion device 8 with the plate 7 produces a counter-motion that inns during the imaging time at least approximately synchronously against the rotation produced by the rotary drive 2. Consequently, the object to be imaged or the radiation appears optically to remain stationary on the detector 5 during the imaging time, although the housing 1 simultaneously continues to rotate. After the counter-motion device 8 has produced the counter-motion during the imaging time, the counter-motion device 8 resumes its original position, in order to repeat the process during the exposure of the next image.

In the exemplary embodiment of the principle, 50 fields per second, for example, are provided, which means that at least approximately an image is produced exactly every 20 milliseconds. The imaging time (exposure time) in which the counter-motion device 8 produces the counter-motion is around four milliseconds. Less than 16 milliseconds are provided for the rearrangement of the counter-motion device 8 in the original alignment. Other intervals are also possible, of course.

Owing to the arrangement of the counter-motion device 8 in the convergent beam path between the last lens 6 and the detector 5, the counter-motion device 8 can be arranged very close to the detector 5, the result being that a substantially smaller counter-motion device 8 is required than would be the case in an arrangement in an afocal or parallel beam path.

The invention is not limited in this case to the lens system illustrated by way of example in FIG. 1. Any other lens systems known to the person skilled in the art are also conceivable.

It would also be conceivable to arrange the counter-motion device 8 in the region of another convergent beam path that is arranged in the lens system.

A control unit 11 with control lines 10 ensures the synchronously opposite motion.

Figure 2:
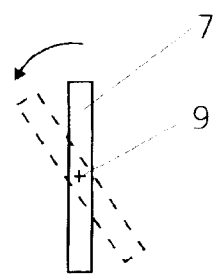
FIG. 2 shows an illustration of the principle of the plane-parallel plate, in plan view.

FIG. 2 shows the plane-parallel plate 7 in plan view. The dashed representation shows the position of the plane-parallel plate 7 after a counter-motion during the imaging time, the counter-motion running synchronously against a rotation produced by the rotary drive 2 of the units housing 1. The pivot axis 9 of the counter-motion device 8 is parallel to the rotation axis 2a of the rotary drive 2.

What is claimed is:

1. A panoramic viewing apparatus having an imaging system that is arranged in a housing, said housing being rotated by a rotary drive, the imaging system mounted within said housing and having a lens system by means of which the images of the objects are imaged on a detector after passing through the lens system, and there being provided in a beam path for the purpose of compensating an image motion caused by the rotation a counter-motion device that produces during an imaging time a motion directed at least approximately synchronously in a counter rotation with the rotation of the rotary drive, wherein said counter-motion device is positioned in a convergent beam path of said lens system.

2. The apparatus as claimed in claim 1, wherein said counter-motion device is arranged in the convergent beam path between a last lens in the lens system and the detector.

3. The apparatus as claimed in claim 1, wherein said counter-motion device has a pivot axis that is parallel to the rotation axis of said rotary drive.

4. The apparatus as claimed in claim 1, wherein said counter-motion device has a transmitting plate.

5. The apparatus as claimed in claim 4, wherein said transmitting plate is designed as a plane-parallel plate.

* * * * *

UNITED STATES PATENT AND TRADEMARK OFFICE
CERTIFICATE OF CORRECTION

PATENT NO. : 6,937,395 B2
APPLICATION NO. : 10/452114
DATED : August 30, 2005
INVENTOR(S) : Jens-Rainer Hoefft et al.

It is certified that error appears in the above-identified patent and that said Letters Patent is hereby corrected as shown below:

column 2, line 66 – column 3 line 1:
instead of ".... on a housing 1, the panoramic viewing apparatus ...." it should read ".... on a housing 1. The panoramic viewing apparatus ...."

column 3, line 2:
instead of ".... an ocular 4, the image of ...." it should read ".... an ocular 4. The image of ...."

column 3, line 8:
instead of ".... a last lens 6, the countermotion device ...." it should read ".... a last lens 6. The countermotion device ...."

column 3, line 12:
instead of ".... that inns during the imaging time ...." it should read ".... that runs during the imaging time ...."

Signed and Sealed this

Twenty-second Day of August, 2006

JON W. DUDAS
*Director of the United States Patent and Trademark Office*